July 22, 1952  H. B. KOCH ET AL  2,603,906
ANIMAL TRAP
Filed April 24, 1948  2 SHEETS—SHEET 1
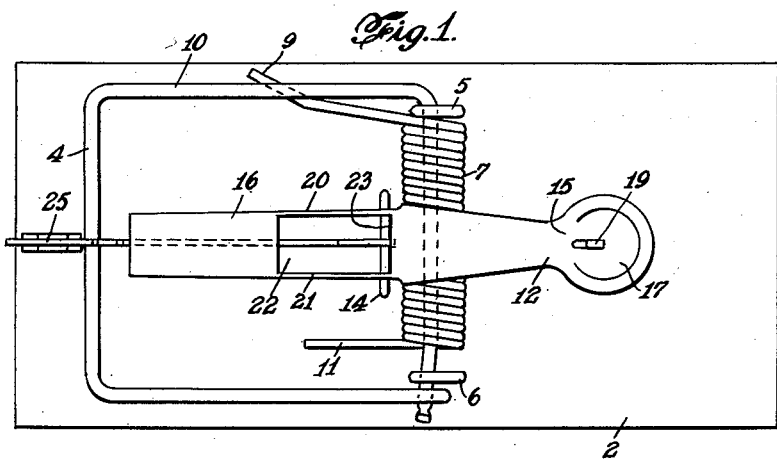
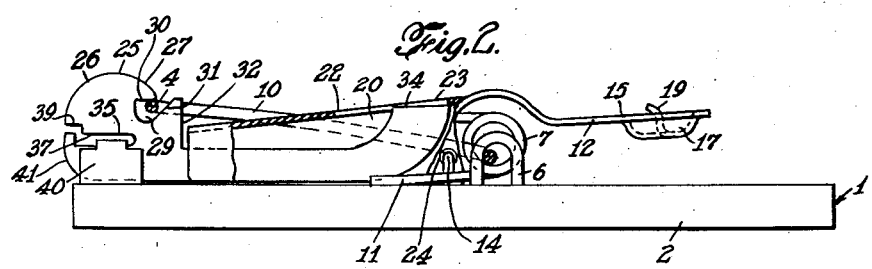
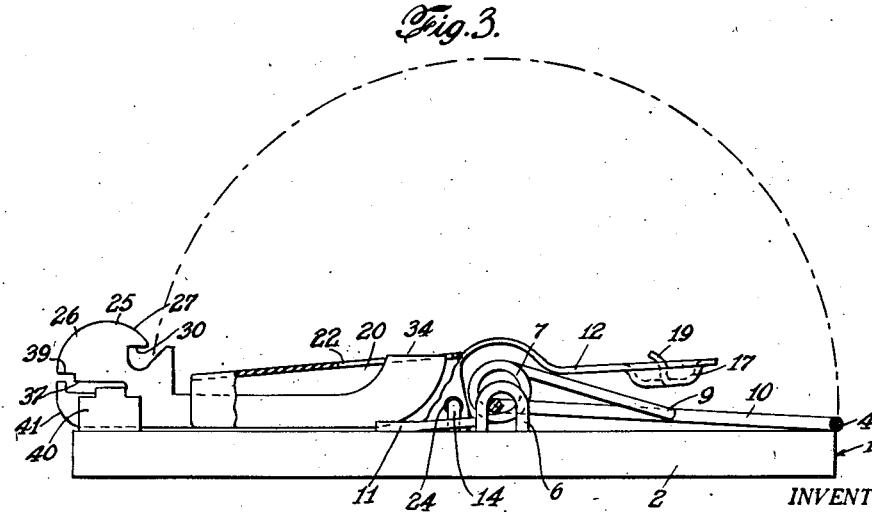
INVENTORS
HAROLD B. KOCH AND
JOHN U. LEHN
BY
ATTORNEY.

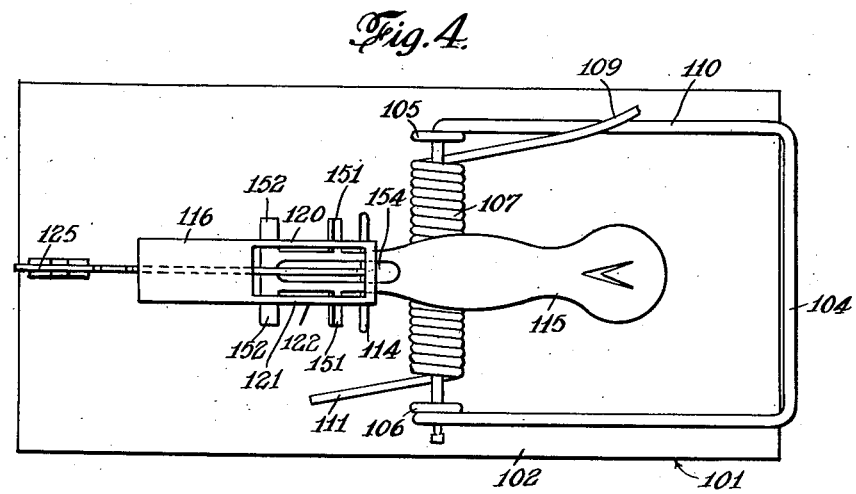
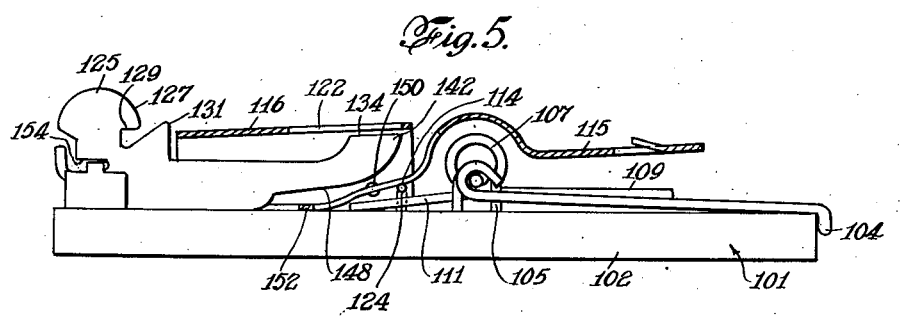
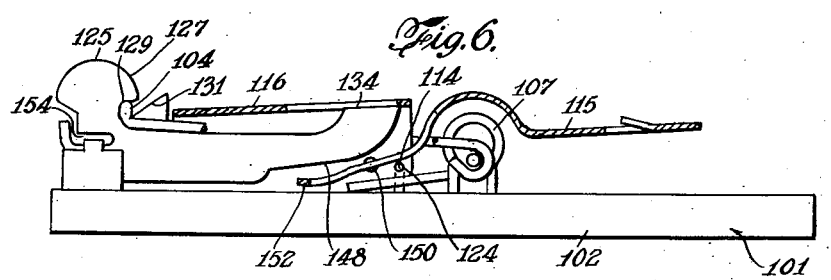

Patented July 22, 1952

2,603,906

UNITED STATES PATENT OFFICE 2,603,906

ANIMAL TRAP

Harold B. Koch and John U. Lehn, Lititz, Pa., assignors to Animal Trap Company of America, Lititz, Pa., a corporation of Pennsylvania Application April 24, 1948, Serial No. 23,084

8 Claims. (Cl. 43—83)

The present invention relates to animal traps and particularly to traps for rodents and other small animals such as rats or mice.

It has heretofore been proposed to provide such traps with automatically operating latching means whereby the trap may be set merely by moving a spring pressed jaw or striking member to set position whereupon it is automatically held by the latch. However, such traps have had several serious disadvantages. The manufacturing costs have been high because of the intricate working parts, the close tolerance requirements and assembling difficulties requiring much hand work. Because of the highly competitive nature of the trap business, the high manufacturing costs of traps with automatically operating latching mechanism has been a serious obstacle to their commercial success.

Moreover, prior traps of this type have tended to be erratic in operation. Sometimes they fail to latch properly and either refuse to hold the jaw in set position or release it prematurely. At other times, they fail to release properly so that an animal can take the bait without springing the trap. Because of their intricate mechanism and the close tolerances required, many of them have failed to operate satisfactorily under varying conditions of service and have not been sufficiently rugged and fool-proof to withstand ordinary use and abuse. A further difficulty is that the automatically operating latch mechanism sometimes becomes "latched" when the jaw of the trap is in "sprung" position and blocks movement of the jaw into "set" position.

An object of the present invention is to overcome the difficulties and disadvantages of prior traps and to provide automatic latch mechanism in a trap of simple and rugged construction which is adapted to be manufactured on existing automatic machinery at low cost and will operate satisfactorily without demanding adherence to close tolerances. Another object of the invention is to provide a new and improved trap having automatic latching mechanism which operates in a positive and effective manner to hold the jaw when it is moved to set position and yet is sufficiently sensitive to release the jaw immediately whenever an animal attempts to take the bait. The trap in accordance with the present invention is substantially uniform in its operation and sensitivity despite normal manufacturing variations incident to mass production methods. A further object of the present invention is the provision of a trap with automatic latch mechanism so constructed that the latch cannot become accidentally locked so as to interfere with the setting of the trap.

In accordance with the present invention, the latch is moved by cam action in the setting operation and does not depend on the operation of parts dropping into place by gravity. Positive and effective action is thereby assured. When the trap is sprung, the jaw is released by pivotal action of the latch. This results in minimum frictional resistance, greater sensitivity and greater reliability, uniformity and speed of operation.

In one embodiment of the invention, means is provided for tripping the trap with a movement in one direction of the bait holding treadle, while in another embodiment the tripping of the trap may be accomplished by movement of the bait holding treadle in either of two directions.

The trap in accordance with the invention is advantageous in that there is positive latching of the jaw by the setting operation inasmuch as the latching member is literally "pushed" into engagement with its holding means. The release is likewise positive as the resiliency of the actuating spring for the jaw moves the latching member out of engagement therewith. Another advantage of the trap is that there is no movement of the bait treadle or counterbalance during the setting operation and thus practically no hazard of the trap being accidentally tripped while being set. A further advantage is that the trap cannot fall into the set position at any time except during the setting process. Further, its simple construction readily lends itself to mass production methods.

Other objects and advantages of the invention will be apparent from the following description and from the accompanying drawings which show, by way of example, embodiments of the invention.

In the drawings:

Fig. 1 is a top view of a trap in accordance with the invention showing the trap in the set position.

Fig. 2 is a side view of the trap shown in Fig. 1 in the set position.

Fig. 3 is a side view of the trap shown in Fig. 1 in the tripped or sprung position.

Fig. 4 is a top view of another embodiment of the trap in accordance with the invention showing the trap in the tripped position.

Fig. 5 is a side view of the trap shown in Fig. 4 in the tripped position.

Fig. 6 is a side view of the trap shown in Fig. 4 in the set position.

Referring to the drawings, there is shown in Fig. 1 a trap 1 in accordance with the invention. The trap includes a generally rectangular shaped base 2 which may be made of wood or other suitable material, a striker or jaw 4 pivotally attached to the base by staples 5 and 6. A coiled spring 7 is adapted to normally urge the jaw in the tripping position, one end 9 of the spring overriding the side 10 of the jaw 4. The other end 11 of the spring 7 is adapted to abut against the top surface of the base 2. In assembling the trap, one end of the spring is held while the other end is turned so as to give the desired tension to the spring. A pivotally mounted bait holding treadle 12 is supported approximately in the center of the base 2 by a staple 14. The treadle is comprised of two portions: a bait holding portion 15 and a weighted portion 16. The bait holding portion 15 is arched upwardly to provide clearance for the spring 7 and is formed with a depressed portion forming a recess 17 having an upwardly and inwardly turned extension 19 adapted to extend into any suitable bait and retain it within the recess 17. The weighted portion 16 of the treadle is formed in a shape of channeled cross section with side walls 20 and 21 and having its open side facing downwardly. The upper side of the weighted portion is slotted as indicated at 22 for a purpose to be later explained. The side walls 20 and 21 of the channeled portion have apertures as indicated at 24 for the pivotal mounting of the treadle on the staple 14. The slot 22 extends forwardly towards the bait holding portion of the treadle just past a vertical plane through the apertures 24 and ends in a detent edge 23. The weighted portion 16 is formed with sufficient material so that normally the bait holding portion 15 is raised away from the base 2 while the weighted portion 16 rests thereon.

A latching member 25 is made of a thin flat material formed with a higher rear end portion 26 having a downwardly and forwardly extending cam surface 27 at the lower end of which is a locking recess 29. The upper wall 30 of the recess 29 preferably is made straight and parallel with the surface of the base 2 although the angle of the wall may be inclined to a slight degree either above or below a line parallel with the base depending upon the desired sensitivity of the tripping action of the trap. The forward wall of the recess 29 is formed with a downwardly and rearwardly extending cam surface 31, and the forward side of the end portion 26 is shaped to provide a vertical shoulder 32. The front end of the latching member 25 is curved upwardly and has a flat tip upper surface 34, the height of this surface being such that the latching member will just slide under the treadle at the forward end of the slot 22. Mounting and guiding means for the latching member 25 are provided so that it will slide forwardly and rearwardly by forming its rear end portion 26 with a generally horizontally extending slot 35, the outer end of which extends upwardly and rearwardly, as indicated at 39, in order to prevent the latch member from sliding too far forward and becoming disengaged from its mounting means or staple member 40. The staple 40 has wide sidewalls to provide guiding surfaces and is inserted in the slot 35 and secured in the base 2 for the mounting and guiding of the latching member 25. The lower surface of the end 26 of the latching member is curved, as indicated at 41, to permit a slight pivotal movement of the latching member 25 on its support. The staple 40 is positioned in the slot 35 so that the latching member is held in an upright position, freedom of movement being assured in the forward and rearward direction and sufficient play being available to permit the latching member to pivotally turn to a slight extent on its rounded end 41.

In setting the trap, it is placed in a horizontal position. The jaw is swung back until it contacts the cam surface 27 of the latching member 25. Pressing the jaw 4 on this surface causes a cam action which slides the latching member 25 rearwardly in its support 40. However, in the event the latch has already slipped rearwardly as far as possible, the jaw 4 will not strike the cam surface 27 but will contact the cam surface 31 thus immediately moving the latch member 25 into the latching position. When the latching member moves far enough for the jaw to clear the forward end of the cam surface 27, the jaw slips into the locking recess 29 and further pressure causes the jaw 4 to contact the cam surface 31 which causes a cam action in the opposite direction, or forwardly, thereby moving the latching member 25 forward until the upper wall 30 of the locking recess 29 is over the jaw and the forward end of the latching member extends under the detent edge 23 at the end of the slot 22. Upon the release of pressure on the jaw, it will move upwardly against the upper wall 30 of the locking recess 29 and tend to turn the latching member in the counterclockwise direction, whereupon the tip 34 will contact the underside of the detent portion 23 of the bait holding treadle at the forward end of the slot 22, thereby restraining further turning of the latching member and securing the jaw 4 in the locking recess 29. The trap is tripped by the downward movement of the bait holding portion 15 of the treadle, thereby pivotally moving the treadle in a clockwise direction about its support 14 and rotating the forward end of slot 22 away from the tip 34 of the latching member 25. The latching member is thereby released and is rotated slightly in a counterclockwise direction by a spring-urged action of jaw 4 on the upper wall 30 of the locking recess 29. This movement of the latching member 25 causes the surface 30 to have a slight upward pitch at its forward end to permit the jaw member 4 to clear the forward end of the cam surface 30 and slip out of the locking recess.

It will be noted that in the setting of this trap the only moving part, aside from the swinging of the jaw 4, is that of the latching member 25 which slides back and forth in a horizontal plane, the weighted portion 16 of the treadle 15 being sufficient to keep it normally resting on the base of the trap and at no time during a setting operation is the treadle moved. Immediately upon its release, after being moved downwardly in tripping the trap, it returns to its normal position.

Another embodiment of the invention is illustrated in Figs. 4 through 6 in which corresponding parts are designated as far as possible by the same reference numbers as in Figs. 1–3 with the addition of 100.

In Fig. 4 there is shown a trap 101 comprising a base 102 with a jaw 104 pivotally mounted thereon by staples 105 and 106 and normally urged in the tripped position by a coiled spring 107. As in the previous embodiment, one end 109 of the spring 107 contacts the upper surface of the side 110 of the jaw 104. The end 111 of the spring 107 presses against the upper surface of the base 102. The latching member 125 is similarly formed and mounted as previously described, excepting that the undersurface of its forward end is cut away as indicated at 148 to provide clearance for a purpose to be hereafter described.

This embodiment of the invention differs from that previously described in that means are provided for tripping the trap by moving the bait holding portion of the treadle in either an upward or a downward direction. In this form of the invention the bait holding treadle is formed in two parts, a bait holding portion 115 and a weighted portion 116. Sidewalls 120 and 121 of the weighted portion 116 are apertured as indicated at 124 for the pivotal support thereof by a staple 114 engaged in the base 102. The side walls 120 and 121 of the weighted portion 116 are also apertured as indicated at 150 to provide a pivotal mounting for the bait holding portion 115. By reason of the positioning of the apertures 124 in the forward end of the weighted portion 116, the member normally remains in position with its rearward end resting on the surface of the base 102. The bait holding portion 115 of the treadle is formed with outwardly extending projections 151 adapted to extend through the apertures 150 for the pivotal mounting of the bait holding portion. The rearward end of the member is formed with outwardly extending portions 152 adapted to contact and extend beyond the bottom surfaces of the channeled weighted portion and thus normally hold the bait holding portion 115 with its forward end raised above the surface of the base 102. The rearward end of the bait holding portion 115 is slotted as indicated at 154 to provide clearance for the forward end of the latching member 125.

The operation of this embodiment of the trap is similar to that of the trap shown in Figs. 1 through 3. The trap is held in a horizontal position while setting and the jaw 104 swung over against the camming surface 127 of the latching member 125, thereby moving it rearwardly so that the jaw member moves down against the camming surface 131, thus moving the latching member in a forward direction and locking the jaw 104 in the locking recess 129. Or, in the event the latching member had already slipped rearwardly as far as possible, the jaw 104 will not strike the cam surface 127 but will directly strike the cam surface 31 thus immediately moving the latch member 25 into the latching position. The tip 142 of the latching member slides under the upper surface of the weighted portion 116 at the end of the slot 122, putting the trap in the set position. The tripping of the trap may be accomplished by moving the bait holding portion downwardly or upwardly.

In the event the trap is to be tripped by a downward movement of the bait holding treadle 115, it moves in a clockwise direction, its undersurface pivoting on the top of the staple 114; its rearwardly extending ends 152 contacting the bottom surface of the channeled weighted portion 116, rotating this member in a clockwise direction and permitting the tip 142 of the latching member 125 to slip through the slot 122, in turn allowing the pivotal movement of the latching member 125 to release the jaw 104, as previously described.

In the event the trap is tripped by an upward movement of the bait holding treadle 115, its rearwardly extending extensions 152 bear against the top surface of the base 102 and its outwardly extending portions 151 engage the apertures 150, thereby swinging the weighted portion 116 in a clockwise direction to permit the tripping of the trap, as already described.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

We claim:

1. An animal trap comprising a base, a spring actuated jaw, a bait holding treadle pivotally supported by the base, latch member engaging means adapted to be actuated by the treadle, and a latch member independent of said treadle and freely slidable horizontally under said latch member engaging means and having a locking recess with a substantially horizontal upper surface to hold the jaw in the set position, the latch member having one cam surface adapted to be engaged by the jaw as the trap is being set to move the latch member rearwardly so that the jaw may enter the locking recess and having a second cam surface adapted to be engaged by the jaw to move the latch member forwardly to lock the jaw in the locking recess and to simultaneously engage the latch member under a portion of said latch member engaging means without movement of said treadle to exert an upward pressure upon said latch member engaging means.

2. An animal trap comprising a base, a spring actuated jaw, a bait holding treadle pivotally supported by the base, latch member engaging means adapted to be actuated by the treadle, and a latch member independent of said treadle and freely slidable horizontally under said latch member engaging means and having a locking recess with a substantially horizontal upper surface to hold the jaw in the set position, the latch member having one cam surface adapted to be engaged by the jaw as the trap is being set to move the latch member rearwardly in a direction parallel to the base so that the jaw may enter the locking recess and having a second cam surface forming a wall of the locking recess and adapted to be engaged by the jaw to move the latch member forwardly in a direction parallel to the base to lock the jaw in the locking recess and to simultaneously engage the latch member under a portion of said latch member engaging means without movement of said treadle to exert an upward pressure upon said latch member engaging means.

3. An animal trap comprising a base, a spring actuated jaw, a bait holding treadle pivotally supported by the base, latch member engaging means adapted to be actuated by the treadle, a latch member independent of said treadle and freely slidable horizontally under said latch member engaging means and having a locking recess with a substantially horizontal upper surface to hold the jaw in the set position, the latch member having one cam surface adapted to be engaged by the jaw as the trap is being set to move the latch member rearwardly so that the jaw may enter the locking recess and having a second cam surface adapted to be engaged by the jaw to move the latch member forwardly to lock the jaw in the locking recess and to simultaneously engage the latch member under a portion of said latch member engaging means without movement of said treadle to exert an upward pressure upon said latch member engaging means, the latch member having a horizontal slot extending inwardly from the outer end thereof, and a supporting member adapted to be received in the slot to attach the latch member to the base of the trap.

4. An animal trap comprising a base, a spring actuated jaw, a bait holding treadle pivotally supported by the base and having a weighted portion on the opposite side of the pivotal mounting from the bait holding portion so that the bait holding portion is normally in a raised position, a latch member independent of said treadle having a locking recess with a substantially horizontal upper surface adjacent one end to hold the jaw in the set position, the latch member having one cam surface adapted to be engaged by the jaw as the trap is being set to move the latch member in a rearward direction so that the jaw may enter the locking recess and having a second cam surface adapted to be engaged by the jaw to move the latch member in a forward direction to lock the jaw in the locking recess, the other end of the latch member being adapted to engage with the treadle substantially at its pivot point to hold the jaw in the set position, said latch member being freely slidable horizontally with respect to said weighted portion whereby the said other end of the latch member is engageable with the under surface of the weighted portion to exert an upward pressure thereon without movement of said treadle.

5. An animal trap comprising a base, a spring actuated jaw, a bait holding treadle pivotally supported by the base and having a weighted portion on the opposite side of the pivotal mounting from the bait holding portion so that the bait holding portion is normally in a raised position, a latch member independent of said treadle having a locking recess with a substantially horizontal upper surface adjacent one end to hold the jaw in the set position, the latch member having one cam surface adapted to be engaged by the jaw as the trap is being set to move the latch member in a rearward direction so that the jaw may enter the locking recess and having a second cam surface adapted to be engaged by the jaw to move the latch member in a forward direction to lock the jaw in the locking recess, the other end of the latch member being adapted to extend under the treadle substantially at its pivot point to hold the jaw in the set position, the weighted portion of the bait holding treadle extending rearwardly from its pivotal mounting and located above and spaced from the latch member, said latch member being freely slidable horizontally with respect to said weighted portion whereby the said other end of the latch member is engageable with the under surface of the weighted portion to exert an upward pressure thereon without movement of said treadle.

6. An animal trap comprising a base, a spring actuated jaw, a bait holding treadle pivotally supported by the base and having a channel-shaped weighted portion on the opposite side of the pivotal mounting from the bait holding portion so that the bait holding portion is normally in a raised position, a latch member independent of said treadle having a locking recess with a substantially horizontal upper surface adjacent one end to hold the jaw in the set position, the latch member having one cam surface adapted to be engaged by the jaw as the trap is being set to move the latch member in a rearward direction so that the jaw may enter the locking recess and having a second cam surface adapted to be engaged by the jaw to move the latch member in a forward direction to lock the jaw in the locking recess, the other end of the latch member being adapted to extend upwardly under the bait holding portion of the treadle to hold the jaw in the set position, the weighted portion of the bait holding treadle extending rearwardly from its pivotal mounting and located above and spaced from the latch member, the weighted portion of the bait holding treadle being slotted to permit the upwardly extending end of the latch member to swing upwardly to release the jaw from the locking recess when the bait holding treadle is depressed, said latch member being freely slidable horizontally with respect to said weighted portion whereby the said other end of the latch member is engageable with the under surface of the weighted portion to exert an upward pressure thereon without movement of said treadle.

7. An animal trap comprising a base, a spring actuated jaw, a bait holding treadle, a weighted channel-shaped member normally adapted to hold the bait holding treadle in the raised position and apertured to provide a pivotal mounting therefor, the bait holding treadle having outwardly extending projections adapted to be received in the apertures of the weighted member, the weighted member being pivotally supported by the base, a latch member having a locking recess with a substantially horizontal upper surface adjacent one end to hold the jaw in the set position, the latch member independent of said treadle having one cam surface adapted to be engaged by the jaw as the trap is being set to move the latch member in a rearward direction so that the jaw may enter the locking recess and having a second cam surface adapted to be engaged by the jaw to move the latch member in a forward direction to lock the jaw in the locking recess, the other end of the latch member adapted to extend under the weighted member to hold the jaw in the set position, the weighted member being slotted to permit the other end of the latch member to swing upwardly to release the jaw from the locking recess when the bait holding treadle is moved on its pivotal axis, said latch member being freely slidable horizontally with respect to said weighted portion whereby the said other end of the latch member is engageable with the under surface of the weighted portion to exert an upward pressure thereon without movement of said treadle.

8. An animal trap comprising a base, a spring actuated jaw, a bait holding treadle, a weighted member normally adapted to hold the bait holding treadle in the raised position and pivotally connected therewith, the weighted member pivotally supported by the base, a latch member independent of said treadle having a locking recess with a substantially horizontal upper surface adjacent one end to hold the jaw in the set position, the latch member having one cam surface adapted to be engaged by the jaw as the trap is being set to move the latch member in a rearward direction so that the jaw may enter the locking recess and having a second cam surface adapted to be engaged by the jaw to move the latch member in a forward direction to lock the jaw in the locking recess, the other end of the latch member adapted to engage the weighted member to hold the jaw in the set position, said latch member being freely slidable horizontally with respect to said weighted portion whereby the said other end of the latch member is engageable with the under surface of the weighted portion to exert an upward pressure thereon without movement of said treadle.

HAROLD B. KOCH.
JOHN U. LEHN.

REFERENCES CITED

The following references are of record in the file of this patent:

UNITED STATES PATENTS

| Number | Name | Date |
|---|---|---|
| 2,086,260 | Dougherty | July 6, 1937 |
| 2,094,686 | Stilson | Oct. 5, 1937 |
| 2,100,926 | Stilson | Nov. 30, 1937 |
| 2,202,938 | Zahm | June 4, 1940 |
| 2,247,652 | Dougherty | July 1, 1941 |

FOREIGN PATENTS

| Number | Country | Date |
|---|---|---|
| 736,739 | France | Sept. 26, 1932 |
| 738,730 | France | Oct. 18, 1932 |